Sept. 13, 1960  E. D. DUNNING  2,952,243
FLUID PRESSURE OPERATED STEERING SYSTEM
Filed Dec. 24, 1958  2 Sheets-Sheet 1
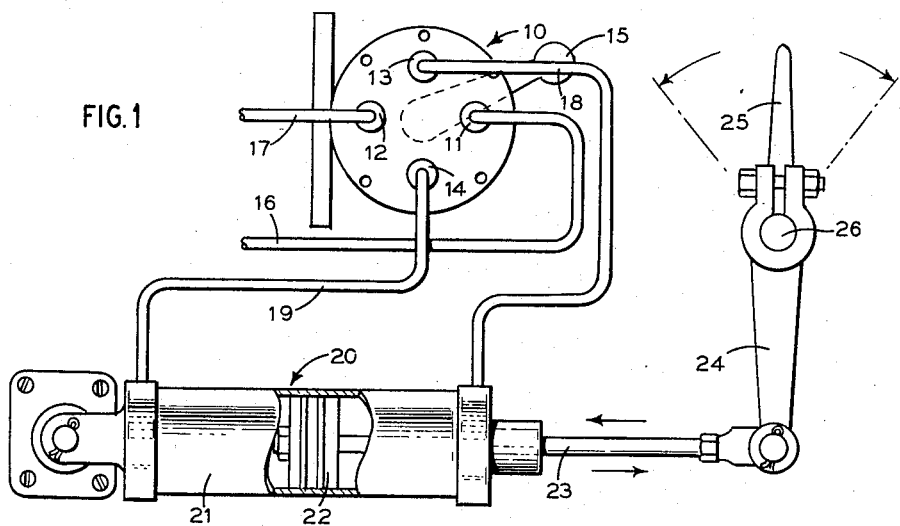
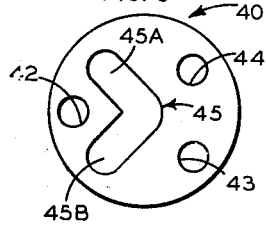
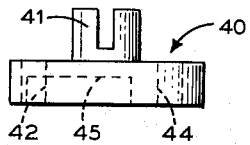
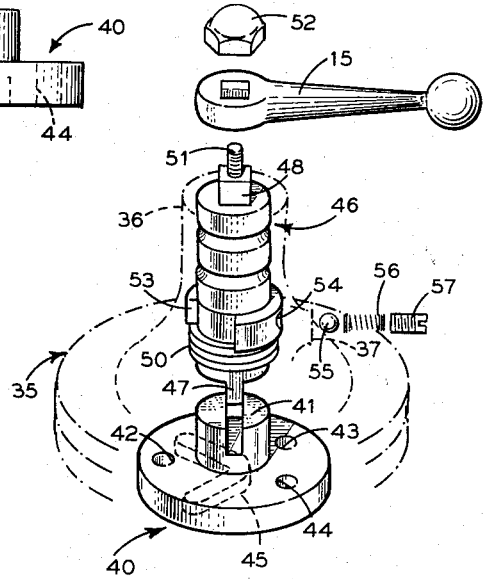
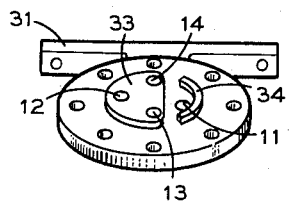
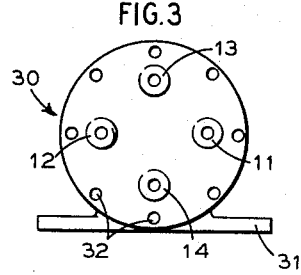
INVENTOR.
Elmer D. Dunning
BY
ATTORNEY Sept. 13, 1960 E. D. DUNNING 2,952,243
FLUID PRESSURE OPERATED STEERING SYSTEM
Filed Dec. 24, 1958 2 Sheets-Sheet 2

INVENTOR.
Elmer D. Dunning
BY
Irving Seidman
ATTORNEY

United States Patent Office 2,952,243
Patented Sept. 13, 1960

2,952,243

FLUID PRESSURE OPERATED STEERING SYSTEM

Elmer D. Dunning, 231 W. 6th Ave., Roselle, N.J.

Filed Dec. 24, 1958, Ser. No. 782,862

4 Claims. (Cl. 121—38)

This invention relates to servomotor systems and, more particularly to fluid pressure operated servomotor systems operable, upon movement of a control member from a neutral position, to continuously move a controlled component in a selected direction until the control member is returned to the neutral position, the controlled component being locked against movement when the control member is in the neutral position.

The system of the invention, while of generally applicability, is particularly well adapted to the steering of boats, ships and other water craft. When used for such purpose, each movement of the control member from a neutral position results in movement of the rudder in a selected direction and, when the control member is returned to the neutral position, the rudder is pressure fluid locked in the new position.

More specifically, the invention includes a control valve comprising casing means having a pressure fluid inlet port, a pressure fluid outlet port, and a pair of working ports connected to the fluid pressure actuator for the controlled member, such as a steering rudder. A movable valve member is enclosed in the casing and has an operating or control member, such as a lever, movable between a neutral position and either of a pair of operating positions.

The valve member is formed with fluid conducting passages and, in one embodiment of the invention, when the valve is in the neutral position, all the ports are interconnected so that all are at the same pressure. As the working ports are connected to a cylinder on opposite sides of the piston therein, the pressure on the piston is equalized and thus this piston-cylinder type actuator remains immovable or locked. When the valve member is moved to either operating position, one working port is connected to the pressure fluid inlet port and the other to the exhaust or return port, so that the piston is subjected to a differential pressure and is moved in a selected direction.

For an understanding of the invention principles, reference is made to the following description of typical embodiments thereof as illustrated in the accompanying drawings. In the drawings:

Fig. 1 is a somewhat schematic plan view of pressure fluid actuated steering apparatus embodying the invention;

Fig. 2 is an exploded view, partly in phantom, of a preferred form of control valve;

Fig. 3 is a bottom plan view of the base of the valve casing;

Fig. 4 is a top plan view of the base;

Fig. 5 is a bottom plan view of the valve member;

Fig. 6 is a side elevation view of the valve member; and

Figure 7:
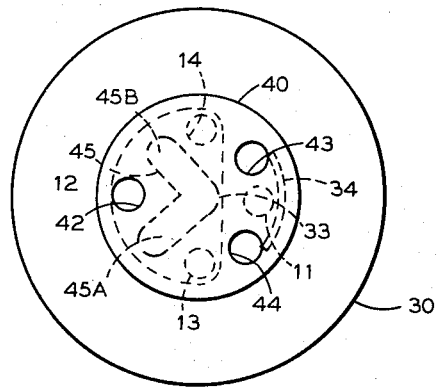
Figs. 7, 8 and 9 are top plan views of the valve member on the base member and respectively illustrating the neutral position and the two operating positions of the valve member.

Referring to Figs. 1 through 9, a rotary valve 10 embodying the invention is illustrated as controlling the application of pressure fluid to a fluid pressure actuator 20 controlling motion of a steering device, such as a boat rudder 25. Valve 10 is shown as having four ports 11, 12, 13, 14 arranged in substantially diametrically opposed pairs, or at positions 90 degrees apart. A conduit 16 connects port 11 to a source of fluid under pressure, and a return or exhaust conduit 17 connects port 12 to the sump of such source. Conduits 18 and 19 connect ports 13 and 14, respectively to opposite ends of cylinder 21 of actuator 20.

Actuator 20 includes a piston 22 movable in cylinder 21 and having a piston rod 23 connected to an arm 24 clamped to a shaft 26 about the axis of which rudder 25 is oscillatable. Valve 10 is so arranged that, under normal conditions, pressure fluid is supplied to both conduits 18, 19 and thus to both sides of piston 22.

To operate rudder 25, handle 15 of valve 10 is swung to a position connecting one conduit 18 or 19 to pressure inlet conduit 16, and the other conduit 19 or 18 to return conduit 17. Thus, one side of piston 22 is under inlet pressure and the other side is subjected to the much lower exhaust pressure. Piston 22, through rod 23 and arm 24, thus swings rudder 25 and, when the desired rudder movement has been effected, the handle 15 is returned to neutral or normal to equalize the pressures acting on opposite faces of piston 22.

Valve 10 comprises a circular base 30 having a tangential mounting flange 31 and circumferentially spaced apertures 32 to receive bolts securing base 30 to a housing 35. The upper surface of base 30 has a land 33, of triangle shape with rounded corners, through which ports 12, 13 and 14 extend, and an arcuate land 34 coaxial with the base and centered outside inlet port 11.

The housing 35 encloses a circular valve plate 40 having a slotted cylindrical boss 41 on its upper surface. The lower face of plate 40 is formed with a gutter or groove 45 having two radial branches 45A and 45B at right angles to each other. Valve plate 40 has a hole 42 therethrough on a radius bisecting gutter 45, and two holes 43, 44 each diametrically aligned with a branch 45A or 45B.

Housing 35 has a tubular neck 36 receiving a shaft 46 having a key 47 on its inner end seatable in the slot in boss 41. The upper end of shaft 46 is squared, as at 48, to engage a square hole in the inner end of handle 15 held on shaft 46 by a nut 52 threaded on an extension 51 of the shaft. Intermediate its ends, shaft 48 has a collar 53 engaging a coil spring 50 embracing the shaft and biasing plate 40 against base 30. This collar has a peripheral groove 54 engaging a ball 55 in a bore 37 in neck 36, ball 55 being biased by a coil spring 56 held in bore 37 by set screw 57.

Referring to Figs. 4 and 7, valve member 40 rides on land 33 and land 34. In Fig. 7, the valve member is in the neutral position. Pressure fluid entering port 11 fills the casing around base 30 and member 40 and flows through ports 43, 44 to port 42 which is in registry with outlet or return port 12. Working ports 13, 14 are blocked off and the pressures on both sides of piston 22 are equalized.

Figure 8:
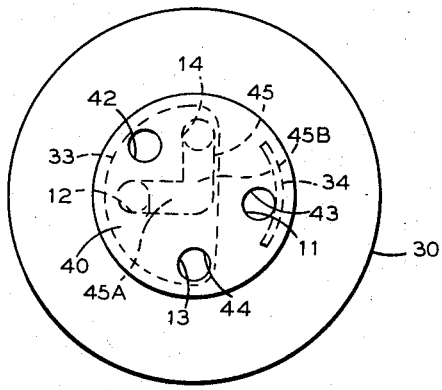

When valve member 40 is turned to the position of Fig. 8, gutter 45 interconnects ports 12 and 14, port 43 registers with port 11, and port 44 registers with port 13. Fluid at inlet pressure thus flows to the right end of cylinder 21, as viewed in Fig. 1, and the left end of cylinder 21 is connected to return conduit 16, so that piston 22 moves to the left.

Figure 9:
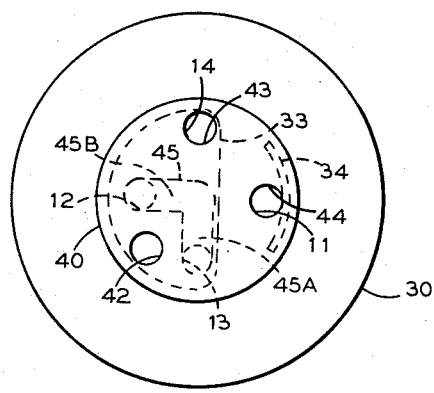

In the position of valve member 40 in Fig. 9, port 14 is connected to inlet port 11 and port 13 to return port 12. Piston 22 is thus moved to the right.

While a specific embodiment of the invention has been shown and described in detail to illustrate the application of the invention principles, it will be understood that the invention may be embodied otherwise without departing from such principles.

What is claimed is:

1. Fluid pressure operated steering apparatus comprising, in combination, a steering element movable in opposed directions; a cylinder; a piston in said cylinder having a piston rod connected to said element; a control valve including a circular base formed with four ports therethrough spaced 90 degrees apart and including a fluid pressure inlet port, a return port, and a pair of diametrically opposite working ports, the inner surface of said base having a land through which extend the working ports and one of the other two ports, and a casing secured to said base; a circular valve plate in said casing engaging said land and having a gutter in its base engaging surface including two communicating radial branches at right angles to each other, said valve plate having three ports therethrough, one intermediate said branches and the other two being each diametrically aligned with a different branch; said valve having a neutral position in which said one port of said valve plate registers with one of said inlet and return ports and the other two ports of said valve plate establish communication between said inlet and return ports, and a pair of operated positions in each of which said gutter connects one working port to one of said inlet and return ports and said other two ports of said valve plate interconnect the other working port to the other of said inlet and return ports; means connecting said inlet port to a source of fluid under pressure having a return sump; means connecting said return port to said sump; and means connecting said working ports to opposite ends of said cylinder.

2. Fluid pressure operated steering apparatus as claimed in claim 1 in which said valve plate has a slotted boss on its outer surface; and an operating shaft having a key on its inner end engageable in said slotted boss.

3. Fluid pressure operated steering apparatus as claimed in claim 1 in which the inner surface of said base has an arcuate land centered on and radially outside the fourth port in the base.

4. Fluid pressure operated steering apparatus as claimed in claim 1, in which said valve member in said neutral position blocks off both working ports and makes them inoperative.

References Cited in the file of this patent

UNITED STATES PATENTS

| | | |
|---|---|---|
| 1,055,781 | Mitchell et al. | Mar. 11, 1913 |
| 1,067,232 | Adams | July 13, 1913 |
| 1,458,355 | Nelson | June 12, 1923 |
| 1,582,468 | Heald et al. | Apr. 27, 1926 |
| 2,583,242 | Turkenkoph et al. | Jan. 22, 1952 |